United States Patent
Viswanath et al.

(10) Patent No.: US 9,886,539 B2
(45) Date of Patent: Feb. 6, 2018

(54) DESIGNING CIRCUITS USING PSEUDOHIERARCHY

(71) Applicant: Oracle International Corporation, Redwood Shores, CA (US)

(72) Inventors: Mani Viswanath, Austin, TX (US); Thomas Mitchell, Austin, TX (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 34 days.

(21) Appl. No.: 15/099,317

(22) Filed: Apr. 14, 2016

(65) Prior Publication Data

US 2017/0300601 A1   Oct. 19, 2017

(51) Int. Cl.
   *G06F 17/50* (2006.01)
(52) U.S. Cl.
   CPC ........ *G06F 17/505* (2013.01); *G06F 17/5072* (2013.01)
(58) Field of Classification Search
   CPC ..................................................... G06F 17/50
   USPC ........................................................ 716/102
   See application file for complete search history.

(56) References Cited

U.S. PATENT DOCUMENTS

2016/0098509 A1\* 4/2016 Seo ..................... G06F 17/5072
                                                        716/55

OTHER PUBLICATIONS

Tao Ye, Terry et al., "Data Path Placement with Regularity", 2000 Proceedings of the IEEE/ACM International Conference on Computer-Aided Design, Nov. 5-9, 2000, pp. 264-270 (7 pages).
Microsemi, Application Note AC 373, "Source-Synchronous Clock Designs: Timing Constraints and Analysis", www.Microsemi.com, Aug. 2011 (12 pages).
Eik Wee, C. et al., "Nano-Scale VLSI Clock Routing Module based on Useful-Skew Tree Algorithm", Regional Postgraduate Conference on Engineering and Science (RPCES 2006), Johore, Jul. 26-27, 2006 (5 pages).
Lockhart, Derek, "RTL-to-Gates Synthesis using Synopsys Design Compiler", ECE5745 Tutorial 2 (Version 606ee8a), Jan. 22, 2015. (15 pages).

\* cited by examiner

*Primary Examiner* — Thuan Do
(74) *Attorney, Agent, or Firm* — Osha Liang LLP

(57) ABSTRACT

A method for designing a circuit. The method may include obtaining a register-transfer level (RTL) file for an integrated circuit. The method may further include generating, using an RTL-Synthesis compiler and from the RTL file, a gate-level netlist including a plurality of cells for the integrated circuit. The method may further include determining, using a cross-probe criterion, an amount of cross-correlation between a first cell and a second cell in the gate-level netlist. The method may further include generating, in response to the amount of cross-correlation exceeding a correlation threshold, a cell group including the first cell and the second cell. The method may further include determining a boundary condition for the cell group. The method may further include generating a floorplan. The first cell and the second cell may be placed in the floorplan according to the boundary condition.

17 Claims, 10 Drawing Sheets

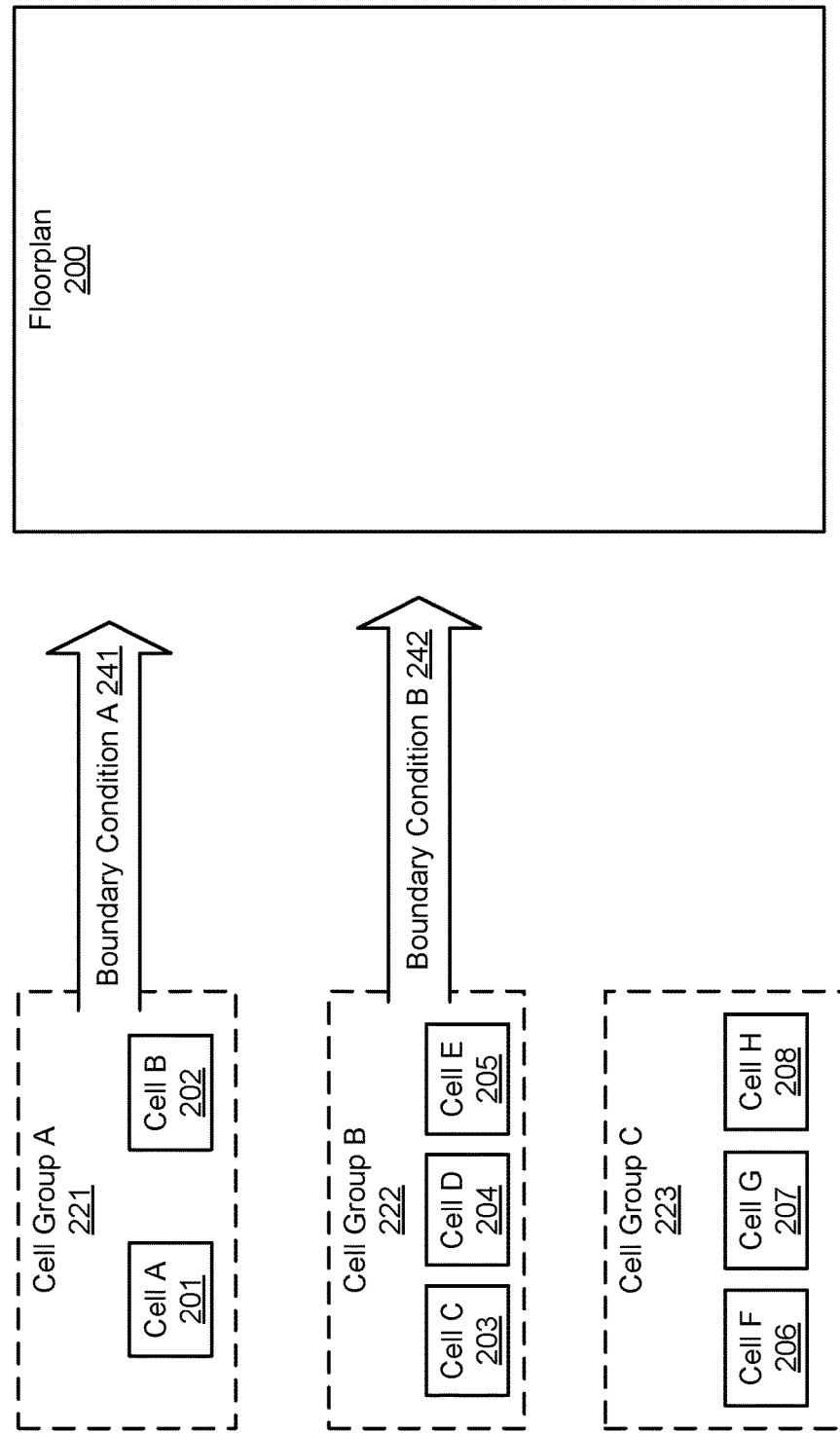
FIG. 2.1

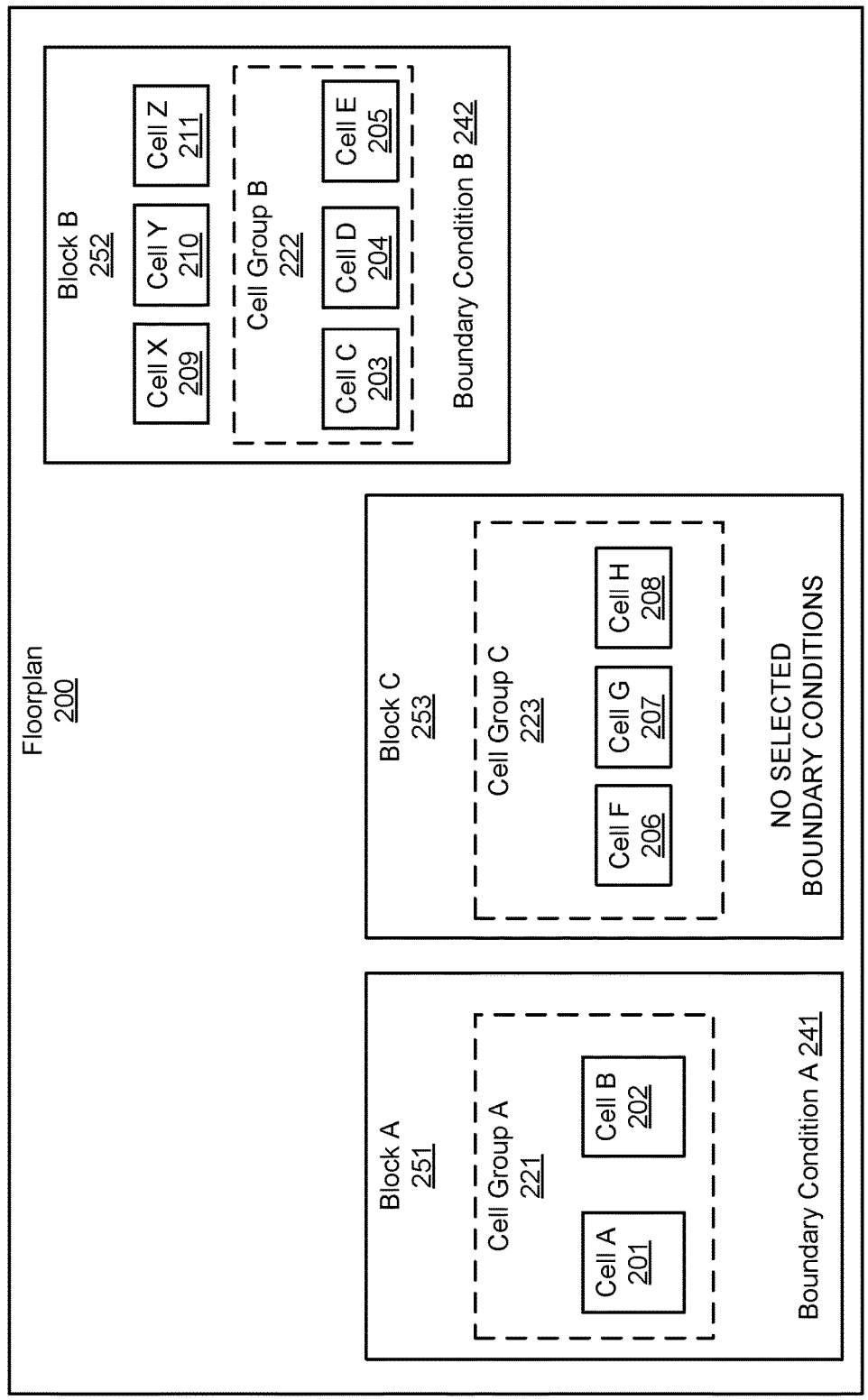
FIG. 2.2

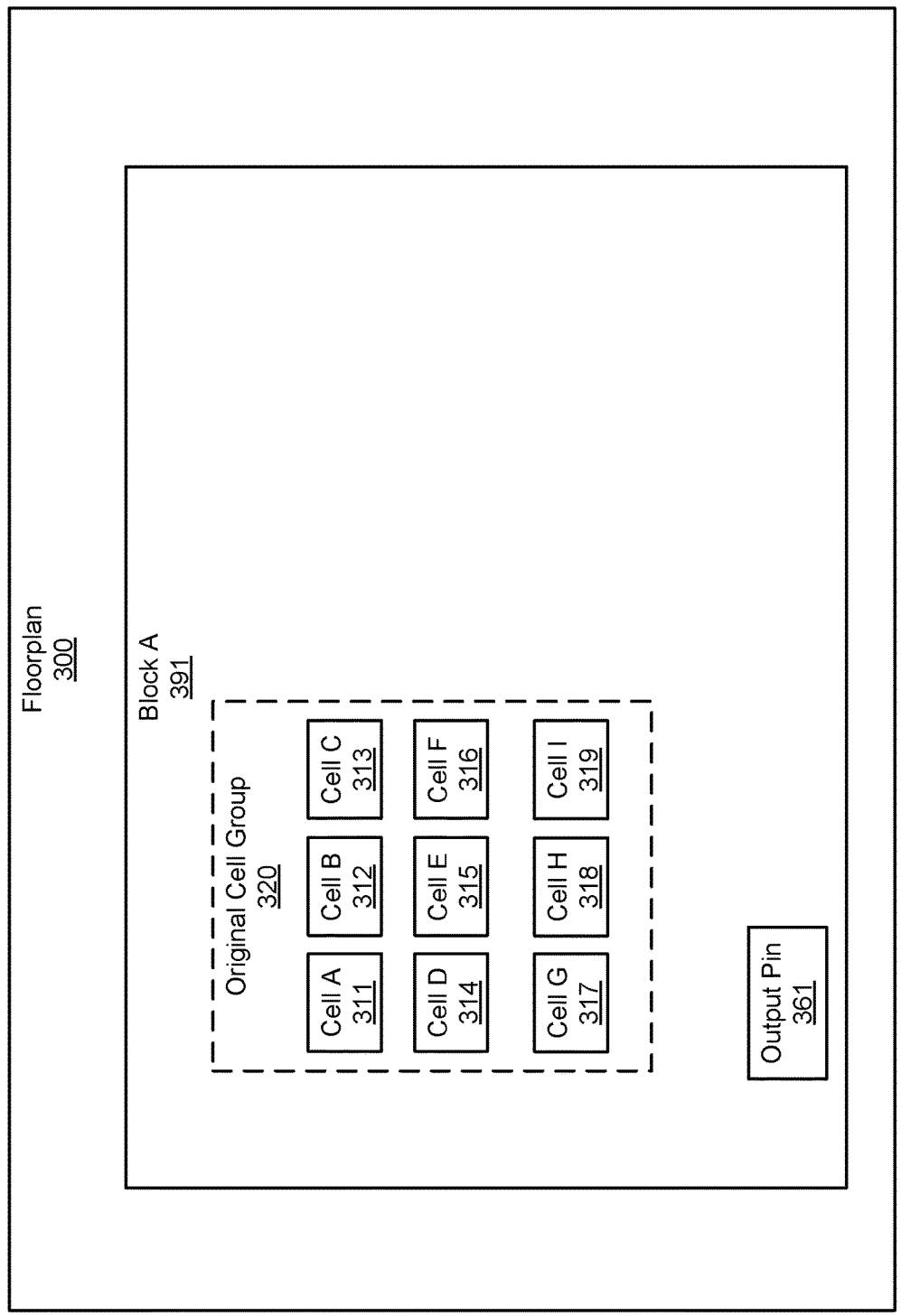
FIG. 3.1

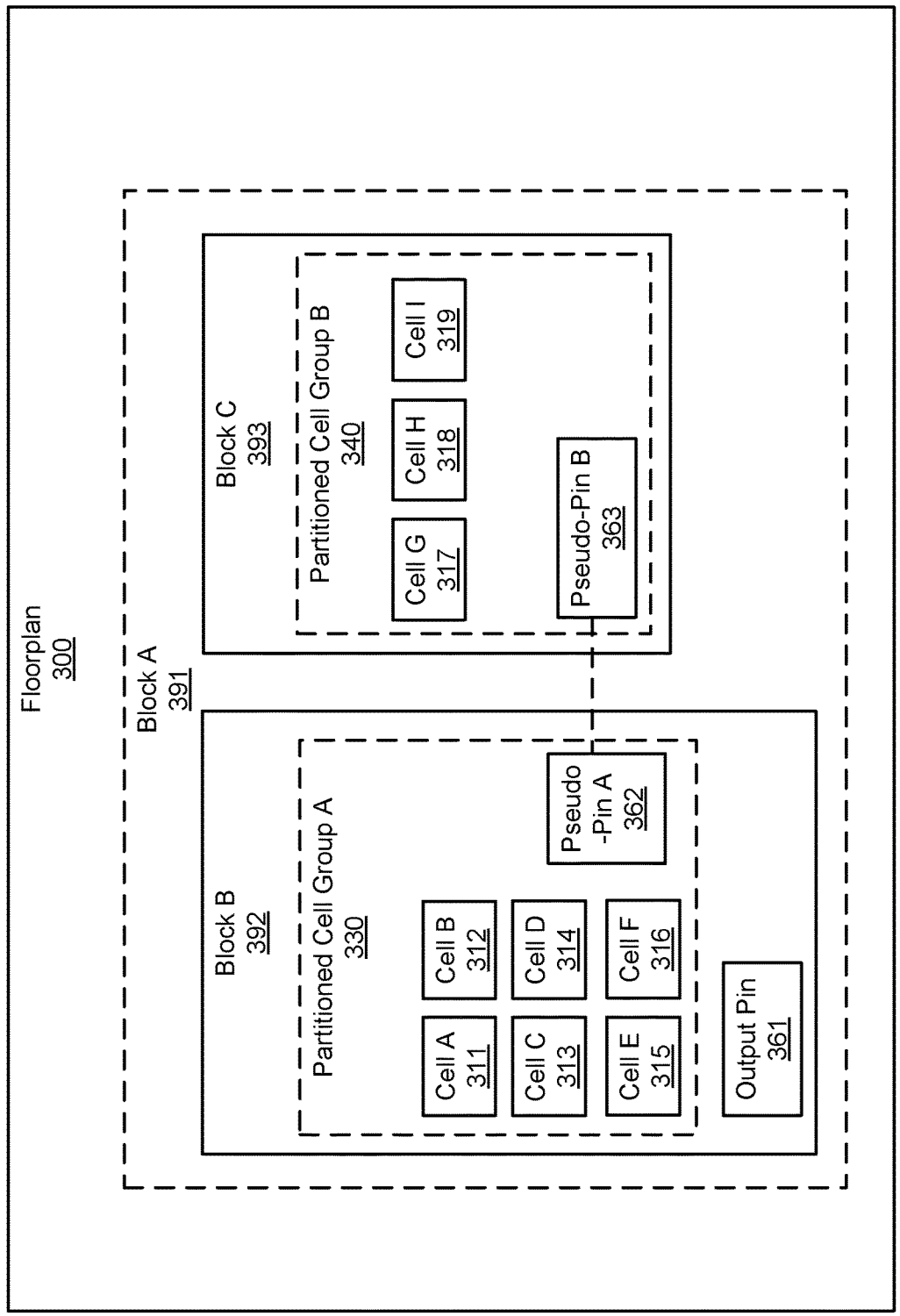
FIG. 3.2

FIG. 8

Cell Correlation Report 810

| Cell Identifier | Cross-Probe Criterion | Comparison Cell | Amount of Cross-correlation |
|---|---|---|---|
| 811 Cell ABC | 820 Clock Skew | 812 Cell DEF | 0.75 |
| 811 Cell ABC | 820 Clock Skew | 813 Cell GHI | 0.21 |
| 811 Cell ABC | 820 Clock Skew | 814 Cell JKL | 0.27 |
| 811 Cell ABC | 820 Clock Skew | 815 Cell MNO | 0.25 |
| 812 Cell DEF | 820 Clock Skew | 811 Cell ABC | 0.81 |
| 812 Cell DEF | 820 Clock Skew | 813 Cell GHI | 0.19 |
| 812 Cell DEF | 820 Clock Skew | 814 Cell JKL | 0.14 |
| 812 Cell DEF | 820 Clock Skew | 815 Cell MNO | 0.32 |
| 813 Cell GHI | 820 Clock Skew | 811 Cell ABC | 0.45 |
| 813 Cell GHI | 820 Clock Skew | 812 Cell DEF | 0.17 |
| 813 Cell GHI | 820 Clock Skew | 814 Cell JKL | 0.09 |
| 813 Cell GHI | 820 Clock Skew | 815 Cell MNO | 0.32 |
| 814 Cell JKL | 820 Clock Skew | 811 Cell ABC | 0.21 |
| 814 Cell JKL | 820 Clock Skew | 812 Cell DEF | 0.23 |
| 814 Cell JKL | 820 Clock Skew | 813 Cell GHI | 0.42 |
| 814 Cell JKL | 820 Clock Skew | 815 Cell MNO | 0.47 |
| 815 Cell MNO | 820 Clock Skew | 811 Cell ABC | 0.33 |
| 815 Cell MNO | 820 Clock Skew | 812 Cell DEF | 0.38 |
| 815 Cell MNO | 820 Clock Skew | 813 Cell GHI | 0.12 |
| 815 Cell MNO | 820 Clock Skew | 814 Cell JKL | 0.24 |

830 Correlation Function (0.75)
830 Correlation Function (0.81)

840 Correlation Threshold = 0.5

850 New Cell Group
811 Cell ABC, 812 Cell DEF

DESIGNING CIRCUITS USING PSEUDOHIERARCHY

BACKGROUND

Microelectronic circuits may consist of millions of transistors and other electronic elements as a direct result of ever decreasing feature size and added circuit functionality. Further, microelectronic circuits may be designed using a hardware description language (HDL), such as the VHSIC hardware description language (VHDL) or Verilog, to model the microelectronic circuits. As such, there are many challenges related to the microelectronic circuit design that are included in both the physical design and verification of the physical design.

SUMMARY

In general, in one aspect, embodiments relate to a method for designing a circuit. The method includes obtaining a register-transfer level (RTL) file for an integrated circuit. The method further includes generating, using an RTL-Synthesis compiler and from the RTL file, a gate-level netlist including a plurality of cells for the integrated circuit. The method further includes determining, using a cross-probe criterion, an amount of cross-correlation between a first cell and a second cell in the gate-level netlist. The method further includes generating, in response to the amount of cross-correlation exceeding a correlation threshold, a cell group including the first cell and the second cell. The method further includes determining a boundary condition for the cell group. The method further includes generating a floorplan. The first cell and the second cell are placed in the floorplan according to the boundary condition.

In general, in one aspect, embodiments relate to a system for designing a circuit. The system includes a processor, a register-transfer level (RTL) file for an integrated circuit, and a memory. The memory includes instructions that, when executed by the processor, cause the processor to obtain the RTL file. The memory further includes instructions that, when executed by the processor, cause the processor to generate, using an RTL-Synthesis compiler and from the RTL file, a gate-level netlist including a plurality of cells for the integrated circuit. The memory further includes instructions that, when executed by the processor, cause the processor to determine, using a cross-probe criterion, an amount of cross-correlation between a first cell and a second cell in the gate-level netlist. The memory further includes instructions that, when executed by the processor, cause the processor to generate, in response to the amount of cross-correlation exceeding a correlation threshold, a cell group including the first cell and the second cell. The memory further includes instructions that, when executed by the processor, cause the processor to determine a boundary condition for the cell group. The memory further includes instructions that, when executed by the processor, cause the processor to generate a floorplan. The first cell and the second cell are placed in the floorplan according to the boundary condition.

In general, in one aspect, embodiments relate to a non-transitory computer readable medium including instructions for designing a circuit. The instructions, when executed by a processor, cause the processor to obtain a register-transfer level (RTL) file for an integrated circuit. The instructions, when executed by the processor, further cause the processor to generate, using an RTL-Synthesis compiler and from the RTL file, a gate-level netlist including a plurality of cells for the integrated circuit. The instructions, when executed by the processor, further cause the processor to determine, using a cross-probe criterion, an amount of cross-correlation between a first cell and a second cell in the gate-level netlist. The instructions, when executed by the processor, further cause the processor to generate, in response to the amount of cross-correlation exceeding a correlation threshold, a cell group including the first cell and the second cell. The instructions, when executed by the processor, further cause the processor to determine a boundary condition for the cell group. The instructions, when executed by the processor, further cause the processor to generate a floorplan. The first cell and the second cell are placed in the floorplan according to the boundary condition.

Other aspects of the invention will be apparent from the following description and the appended claims.

BRIEF DESCRIPTION OF DRAWINGS

FIGS. 2.1 and 2.2 show schematic diagrams in accordance with one or more embodiments.

FIGS. 3.1 and 3.2 show schematic diagrams in accordance with one or more embodiments.

FIG. 8 shows an example in accordance with one or more embodiments.

DETAILED DESCRIPTION

Figure 1:
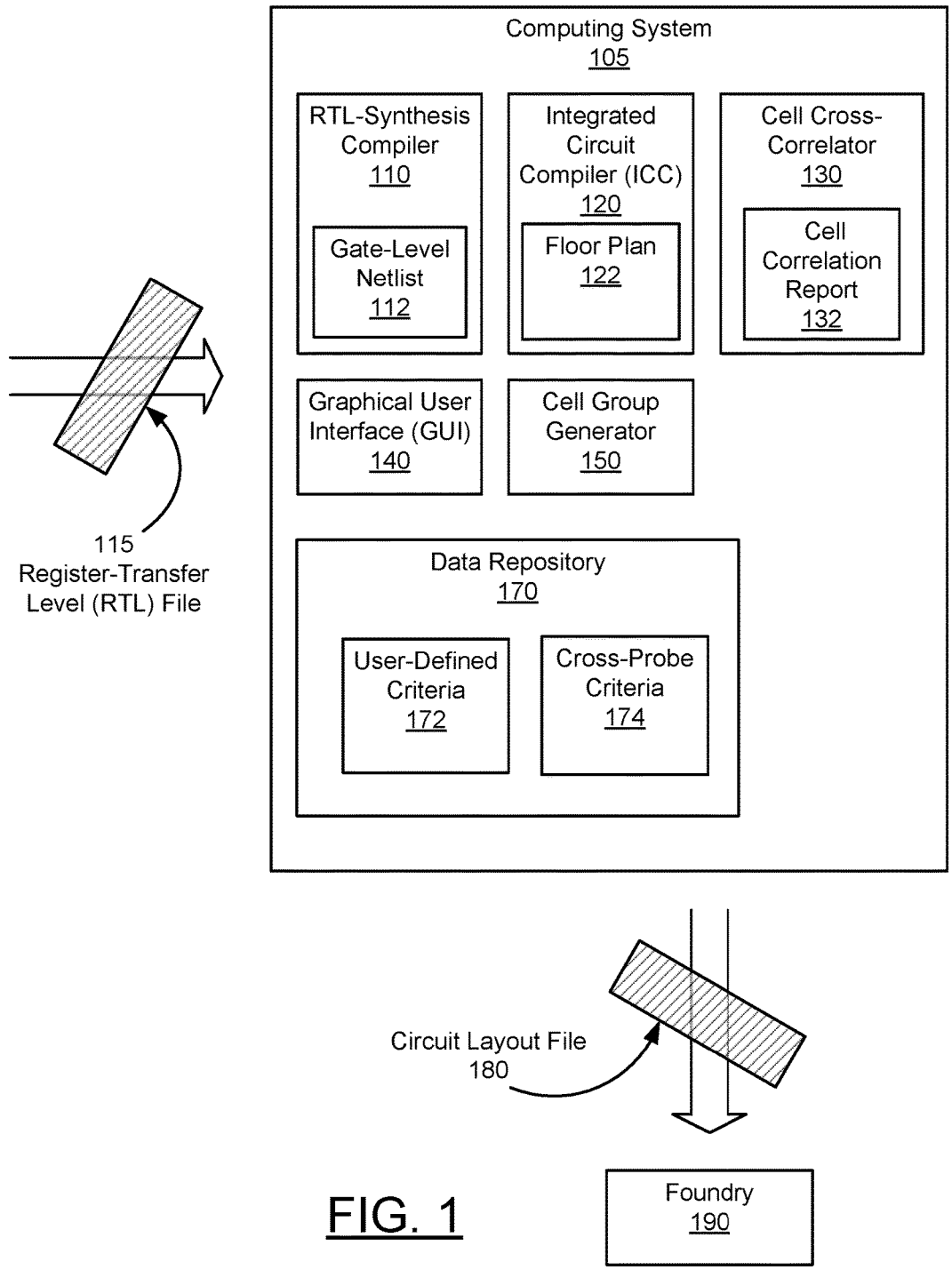
FIG. 1 shows a system in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.)

may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention include a method, a system, and a non-transitory computer readable medium. In particular, one or more embodiments are directed to a method for designing a circuit. For example, various cells within a gate-level netlist may be compared according to one or more cross-probe criteria. Cross-probe criteria may include timing synthesis characteristics, placement synthesis characteristics, and other circuit design metrics for analyzing the gate-level netlist and/or a physical implementation based on the gate-level netlist. Thus, cells within the gate-level netlist that have specified amounts of cross-correlation with each other may be arranged into various cell groups, e.g., by generating a new cell group with correlated cells or by adding the correlated cells to a preexisting cell group. As such, associations between the cells in a particular cell group may be maintained during various stages of circuit development. For example, cells groups generated using cross-probe criteria may be used in generating a new gate-level netlist with various modules based upon the cell groups. On the other hand, cells in a cell group may be arranged within a floorplan to satisfy a particular boundary condition.

FIG. 1 shows a system in accordance with one or more embodiments. As shown in FIG. 1, the system may include a computing system (105) and a foundry (190). In one or more embodiments, the computing system (105) includes various computing modules, such as an RTL-Synthesis Compiler (110), an integrated circuit (IC) compiler (120), a cell cross-correlator (130), a graphical user interface (140), and/or a cell group generator (150). The computing modules may be a combination of hardware and/or software within the computing system (105). Furthermore, the computing modules may not be distinct hardware and/or software, and various functionality performed by the computing system (105) may encompass one or more of the computing modules. Additionally, the foundry (190) may be, for example, a semiconductor fabrication plant that includes functionality to manufacture physical integrated circuits with the design specifications from a circuit layout file (180).

As such, the computing system (105) may include functionality to obtain a register-transfer level (RTL) file (115) for one or more integrated circuits and determine one or more logical and/or physical implementations of the one or more integrated circuits (e.g., circuit layout file (180)). As shown, the RTL file (115) may be received from a third party and/or an external computing system, but the RTL file (115) may also be generated on the computing system (105). The circuit layout file (180) may be a software file with functionality for describing the physical specifications for manufacturing one or more integrated circuits at the foundry (190). The computing system (105) may be implemented on the same or different specialized computer systems of the type found and described in relation to FIG. 4.

Keeping with FIG. 1, the RTL file (115) may be a high-level representation of a portion of an integrated circuit. For example, the RTL file (115) may be a software file in a hardware description language (HDL), such as Verilog or very high speed integrated circuit (VHSIC) hardware description language (VHDL). In particular, HDL code in the RTL file (115) may describe a logical implementation of various digital and/or analog signals communicated between various circuit modules that represent an integrated circuit. For example, a circuit module may designate a logical representation, e.g., in boolean form, of a portion of a specific design architecture having various design specifications. Thus, the design architecture may provide the layout for an application specific integrated circuit (ASIC). Moreover, the design architecture may define particular mechanisms and/or structures in the ASIC to perform various digital logic. Accordingly, the digital logic may include, for example, various electrical inputs to the ASIC and/or various electrical outputs from the ASIC. Furthermore, the code in the RTL file (115) may include a modular design that produces the electrical outputs in response to the electrical inputs.

Keeping with FIG. 1, the RTL-Synthesis compiler (110) corresponds to hardware, software, firmware, or a combination thereof that includes functionality to generate a gate-level netlist (112) from the RTL file (115). Specifically, the gate-level netlist (112) may include a list of terminal identifiers that map the connections of various cells within an integrated circuit. A cell may be a discrete logical and/or physical unit that represents at least a portion of a circuit. For example, cells may correspond to state elements, such as flip-flops, or any other logical circuit type. In a physical implementation, a cell may correspond to various transistors and interconnect structures that form a portion of an integrated circuit. For example, cells may include such various circuit components as state elements, clock headers, etc., within an integrated circuit.

Furthermore, the gate-level netlist (112) may include connectivity information, such as propagation delays between circuit components as well as various other circuit attributes. In producing the gate-level netlist (112), the RTL-synthesis compiler (110) may perform a logical synthesis of the RTL file (110) to map the terminals of one cell, e.g., a source side of a flip-flop, to the gate of another cell, e.g., a sink side of the flip-flop. Thus, the RTL-Synthesis compiler (110) may randomly or pseudorandomly synthe-size various cells within the gate-level netlist (112) using various optimization algorithms.

The integrated circuit compiler (120) may correspond to hardware, software, firmware, or a combination thereof that includes functionality to generate a physical implementation of the gate-level netlist (112). In particular, the physical implementation may be a floorplan (122) that describes the layout of an integrated circuit. The floorplan (122) may be a software file that includes data specifying the location and placement of cells and/or blocks for an integrated circuit. For example, a floorplan may be a two-dimensional schematic representation of the circuit presented using the graphical user interface (140).

Accordingly, the floorplan (122) may be divided into various blocks and sub-blocks. On the other hand, the integrated circuit compiler (120) may include functionality to generate a clock-tree synthesis from cells located inside blocks within the floorplan (122). As such, the clock-tree synthesis may describe the routing of various timing signals from clock headers and buffer headers within the gate-level netlist (112). For another example, the integrated circuit compiler (120) may determine routes for various data paths between various cells from the gate-level netlist (112).

In one or more embodiments, the cell cross-correlator (130) corresponds to hardware, software, firmware, or a combination thereof that includes functionality to determine amounts of cross-correlation between cells in a logical implementation (e.g., the gate-level netlist (112)) and/or a physical implementation (e.g., the floorplan (122)) of a circuit. In one or more embodiments, for example, the cross-correlator (130) determines cross-correlation among cells using one or more of the cross-probe criteria (174). The cross-probe criteria (174) may be a specified metric for comparing synthesis characteristics between different cells within the gate-level netlist (112) and/or the floorplan (122).

In one or more embodiments, the synthesis characteristics relate to logical synthesis characteristics such as cell priority based on performing various circuit functions with designated importance in an integrated circuit. In one or more embodiments, the synthesis characteristics relate to physical synthesis characteristics, such as cell congestion within a block, timing constraints, etc. Thus, the cell cross-correlator (130) may identify various cells based on the different amounts of cross-correlation between various logical and/or physical synthesis characteristics specified as the cross-probe criteria (174). In one or more embodiments, the cell cross-correlator (130) includes functionality to generate a cell correlation report (132) that describes the different amounts of cross-correlation between cells in the gate-level netlist (112) and/or floorplan (122). The cell correlation report (132) may be a data file, or stored in memory and presented in GUI (140). For an example of a cell correlation report (132), see FIG. 8 and the accompanying description.

In one or more embodiments, the cell group generator (150) corresponds to hardware, software, firmware, or a combination thereof that includes functionality to generate various cell groups. Specifically, in one or more embodiments, a cell may be designated as a member of a cell group by the cell group generator (150) using a pre-defined attribute or tag that defines an association between the cell and the cell group. For example, the attribute or tag may be specified in the gate-level netlist (112) and/or another circuit implementation. In one or more embodiments, the cell group generator (150) includes functionality to determine which cells belong to one or more cell groups based on the amount of cross-correlation between the cells with respect to the cross-probe criteria (174)). Thus, the cell group generator (150) may include functionality to identify to which cell groups that a particular cell belongs. On the other hand, the cell group generator (150) may include functionality to determine that a particular cell does not belong to any cell group.

Turning to FIGS. 2.1-2.2, FIGS. 2.1-2.2 show schematic diagrams in accordance with one or more embodiments. As shown in FIG. 2.1, various cells (e.g., cell A (201), cell B (202), cell C (203), cell D (204), cell E (205), cell F (206), cell G (207), and cell H (208)) may be placed into various cell groups (e.g., cell group A (221), cell group B (222), and cell group C (223)). For example, cell group A (221) includes cell A (201) and cell B (202), while cell group B includes cell C (203), cell D (204), and cell E (205). Moreover, the association between cells within a particular cell group may be designated in an RTL file, in a logical synthesis file such as a gate-level netlist, and/or in a physical implementation such as a floorplan (200).

In generating a logical implementation and/or a physical implementation, one or more of the cell groups (221, 222, 223) may be designated a particular boundary condition that includes functionality for specifying various desired synthesis characteristics within a particular implementation. Specifically, boundary conditions may describe various logical and/or physical synthesis characteristics, such as predefined cell density, timing requirements, congestion levels, effort bounds, etc. regarding the logical implementation and/or physical implementation of an integrated circuit. For example, a boundary condition may be a move bound that determines a placement of one or more cells within the floorplan (200) or other physical implementation. With regard to cell density, a density bound may specify an amount of spreading among cells within a block in the floorplan (200). In other words, the density bound may generate a block having cells with a specified spacing between adjacent cells in the block.

Boundary conditions may also specify various timing constraints. For example, a clock tree synthesis (not shown) may be generated for cells and blocks in the floorplan (200). Thus, in one or more embodiments, a boundary condition may specify a clock skew among the cells in one of the cell groups (221, 222, 223). Accordingly, an IC compiler may generate a clock tree synthesis where each cell in the cell group has the specified clock skew using corresponding clock headers and clock buffers.

Furthermore, boundary conditions may also be soft bounds, where the soft bound may specify one or more desired logical and/or physical synthesis characteristics in a particular implementation. However, an RTL-Synthesis compiler or Integrated Circuit compiler may violate the soft bound in response to another boundary condition with higher priority or a requirement by a synthesis algorithm in the respective compiler. On the other hand, a boundary condition may be a hard bound. With a hard bound condition, an RTL-Synthesis compiler or Integrated Circuit compiler may be required to generate an implementation with one or more desired synthesis characteristics specified by the hard bound.

Turning to FIG. 2.2, various blocks (e.g., block A (251), block B (252), and block C (253)) are shown within the floorplan (200). A block may be a predefined area within the floorplan (200) or another physical implementation that specifies space that may be occupied by various routing connections, such as wire traces for clock signals, data signals, etc. As shown in FIG. 2.2, the blocks (251, 252, 253) include the cell groups (221, 222, 223) and the corresponding cells from FIG. 2.1. Accordingly, the cell groups (221, 222) within block A (251) and block B (252) are placed using the boundary conditions (241, 242). However, as no boundary condition was specified for cell group C (223) from FIG. 2.1, no boundary conditions may be applied to cell group C (223) contained inside block C (252). Also, block B (252) has various cells (e.g., cell X (209), cell Y (210), cell Z (211)) generated in the floorplan (200) that are not members of any cell group. Thus, an IC compiler may generate the floorplan (200) such that boundary condition A (241) and boundary condition B (242) are satisfied, while the IC compiler may apply various physical synthesis algorithms to place the cells within block C (253) randomly or pseudorandomly without regard to additional selected boundary conditions.

Turning to FIGS. 3.1-3.2, FIGS. 3.1-3.2 show schematic diagrams in accordance with one or more embodiments. As shown in FIG. 3.1, various cells (i.e., cell A (311), cell B (312), cell C (313), cell D (314), cell E (315), cell F (316), cell G (317), cell H (318), cell I (319)) may be disposed in an original cell group (320) that is located within a block A (391) of a floorplan (300). In FIG. 3.2, the original cell group (320) is divided into a partitioned cell group A (330) within block A (391) that includes various cells (i.e., cell A (311), cell B (312), cell C (313), cell D (314), cell E (315), cell F (316)) and a partitioned cell group B (340) that includes the remaining cells (i.e., cell G (317), cell H (318), cell I (319)). Accordingly, partitioned cell group A (330) is disposed in block B (392) of the floorplan (300), while partitioned cell group B (340) is disposed in block C (393) of the floorplan (300).

In one or more embodiments, various pseudo pins (e.g., pseudo pin A (362), pseudo pin (363)) are used within the floorplan (300) to enforce various physical boundary conditions. As shown, an output pin A (361) in block A (391) may be used to output a signal to one or more other blocks (not shown) in the floorplan (300). Thus, in one or more embodiments, the pseudo pins (362, 363) provide an input signal or output signal between the partitioned cell groups (330, 340) during an iterative process described in Steps 720-760 described with respect to FIG. 7 below. Thus, the partitioned cell groups may serve as sub-blocks during the iterative process.

In one or more embodiments, the pseudo pins (362, 363) are pin assignments to enforce desired synthesis constraints regarding the partitioned cell group A (330) and/or partitioned cell group B (340). In one or more embodiments, for example, pseudo pins are pin assignments presented in a top level RTL as an input or output signal. Accordingly, a specific constraint may be assigned to a pseudo pin. This constraint may cause an RTL-synthesis compiler and/or an IC compiler to focus optimization efforts on the respective cell group. In other words, without using a pseudo-pin, a logical synthesis and/or a physical synthesis process may not provide weight, e.g., within a cost function, to optimizing the cells within a cell group according to the specific constraint. For example, an RTL-synthesis compiler or an IC compiler may use a pseudo-pin to determine a particular timing path and/or other synthesis characteristic for that cell group.

Returning to FIG. 1, a graphical user interface (GUI) (140) may include functionality to obtain inputs from a user and output (e.g., present) information to the user. Specifically the GUI (140) may include functionality to receive selections of the cross-probe criteria (174), the user-defined criteria (172), and cells within the gate-level netlist (112). Furthermore, the GUI (140) may further be configured to display output of the RTL-synthesis compiler (110), the integrated circuit compiler (120), the cell cross-correlator (130), or a combination thereof.

In one or more embodiments of the invention, the data repository (170) is any type of storage unit and/or device (e.g., a file system, database, collection of tables, or any other storage mechanism) for storing data. Further, the data repository (170) may include multiple different storage units and/or devices. The multiple different storage units and/or devices may or may not be of the same type or located at the same physical site.

Figure 4:
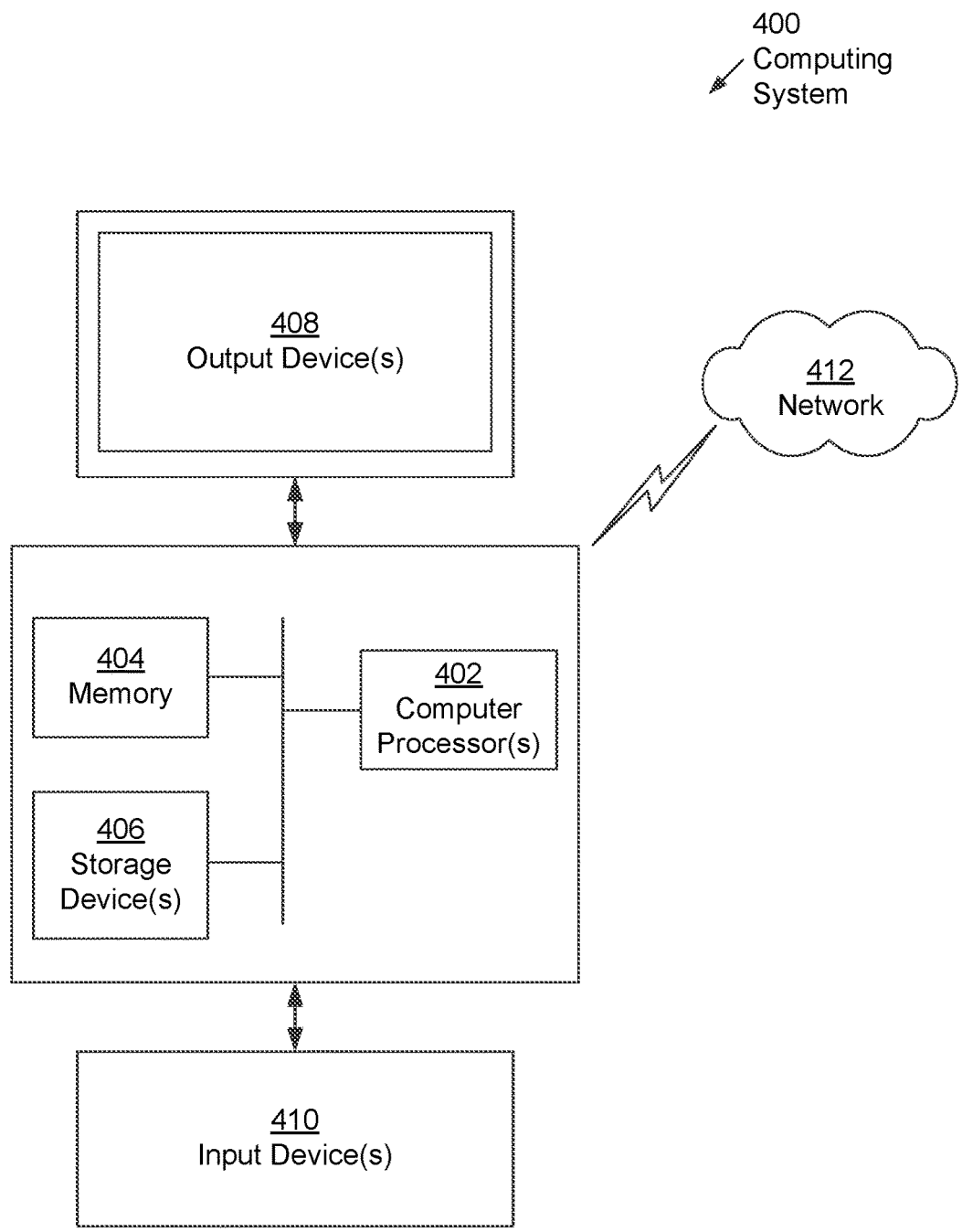
FIG. 4 shows a computing system in accordance with one or more embodiments.

Embodiments of the invention may be implemented on a computing system. Any combination of mobile, desktop, server, embedded, or other types of hardware may be used. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing system. Alternatively, the node may correspond to a computer processor with associated physical memory. The node may alternatively correspond to a computer processor or micro-core of a computer processor with shared memory and/or resources.

Figure 5:
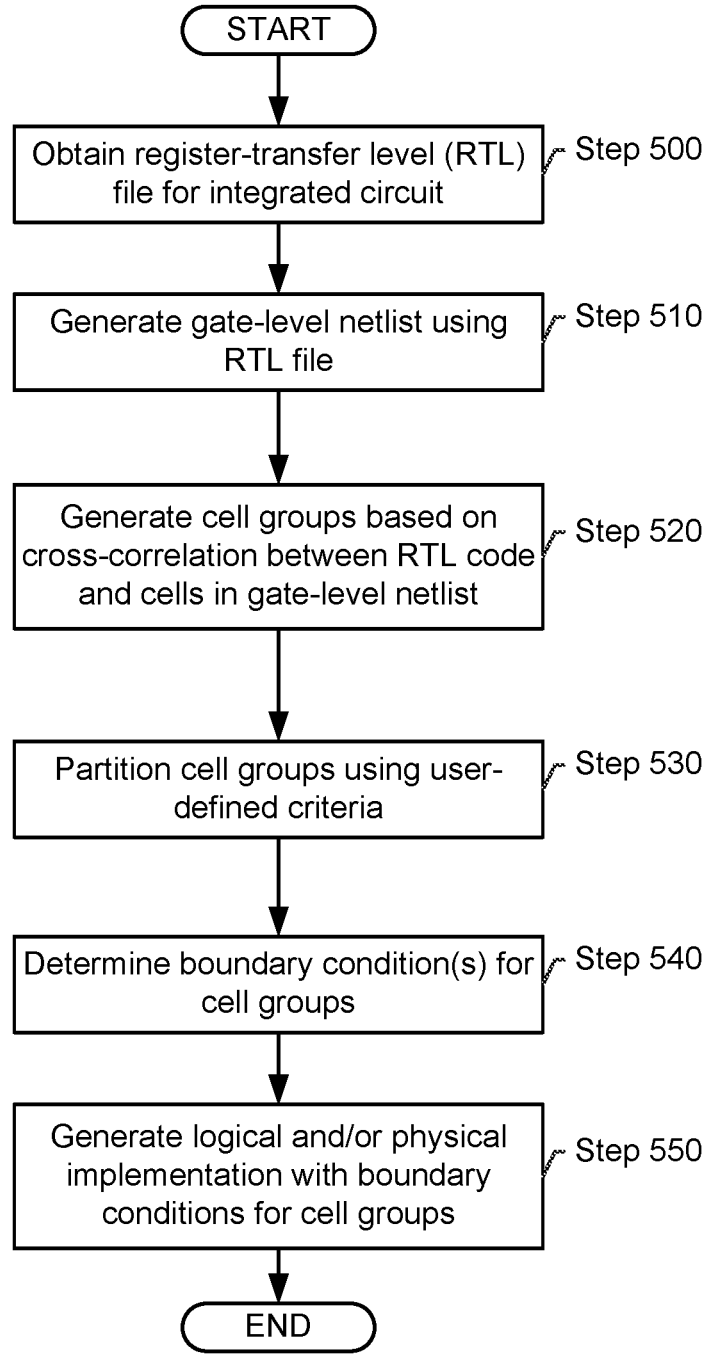
FIGS. 5-7 show flowcharts in accordance with one or more embodiments.

Turning to FIG. 5, FIG. 5 shows a flowchart in accordance with one or more embodiments. The process shown in FIG. 5 may involve, for example, one or more components discussed above in reference to FIG. 1 (e.g., computing system (105)). While the various steps in FIG. 5 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 500, an RTL file is obtained for an integrated circuit in accordance with one or more embodiments. For example, the RTL file may be generated on a computing system by a user, such as a computing system as described in FIGS. 1 and/or 4, or obtained from an outside party.

In Step 510, a gate-level netlist is generated using the RTL file in accordance with one or more embodiments. For example, an RTL-synthesis compiler may be used to convert HDL code from the RTL file in Step 500 to a gate-level netlist. Accordingly, the RTL-synthesis compiler may generate various cells for inclusion in the gate-level netlist. Thus, the gate-level netlist may implement one or more circuit modules described in the RTL file.

In Step 520, various cell groups are generated based on cross-correlation between the RTL code and cells in the gate-level netlist in accordance with one or more embodiments. In one or more embodiments, a cell cross-correlator may perform a cross-correlation analysis on cells within the gate-level netlist using one or more cross-probe criteria. Thus, in one or more embodiments, the cell cross-correlator determines various amounts of cross-correlation between different cells in the gate-level netlist for the cross-probe criteria. For example, the cell cross-correlator may produce a cell correlation report that includes the different amounts of cross-correlation between different cells in the gate-level netlist. If an amount of cross-correlation between two or more cells exceeds a correlation threshold, the two or more cells may be automatically assigned to a new cell group or a preexisting cell group. On the other hand, a user may view the cell correlation report in a graphical user interface and select which cells should be designated as members of a cell group. For more information on performing Step 520, see FIG. 6 and the accompanying description.

In Step 530, various cell groups are partitioned using a user-defined criterion in accordance with one or more embodiments. The cell groups may include cell groups generated in Step 520 with a cross-correlation analysis or may include cell groups generated without a cross-correlation analysis, e.g., cell groups that correspond to circuit modules in HDL code or sub-blocks in a physical implementation. In one or more embodiments, for example, the cell groups in Step 530 are iteratively repartitioned until the partitioned cell groups satisfy the user-defined criterion. Thus, a cell group may be divided into smaller cell groups. In one or more embodiments, cells from one cell group are moved between cell groups in an iterative manner until the user-defined criterion is satisfied in one or more of the cells groups. For more information on performing Step 530, see FIG. 7 and the accompanying description.

In Step 540, one or more boundary conditions are determined for various cell groups in accordance with one or more embodiments. Using a particular cell group from Step 520 or from the partitioned cell groups from Step 530, a boundary condition may be determined. For example, the boundary condition may be obtained from a user, such as through a graphical user interface. Thus, a user may select a particular cell group and designate one or more boundary conditions for that cell group in the next logical implementation or physical implementation. Accordingly, a user may verify and analyze changes to a logical implementation and/or physical implementation of an integrated circuit during the development process, while maintaining various synthesis characteristics among cells in the cell groups from Step 520 or the partitioned cell groups from Step 530.

In Step 550, a logical implementation and/or a physical implementation is generated with various boundary conditions for various cell groups in accordance with one or more embodiments. For example, the boundary conditions from Step 540 may be used to generate a gate-level netlist and/or floorplan accordingly. In other words, when an IC compiler generates a floorplan, cells without a cell group may be placed according to general boundary conditions implemented by the IC compiler rather than boundary conditions specific to a cell group. Accordingly, the IC compiler may place cells located in a respective cell group according to the boundary conditions from Step 540.

Figure 6:
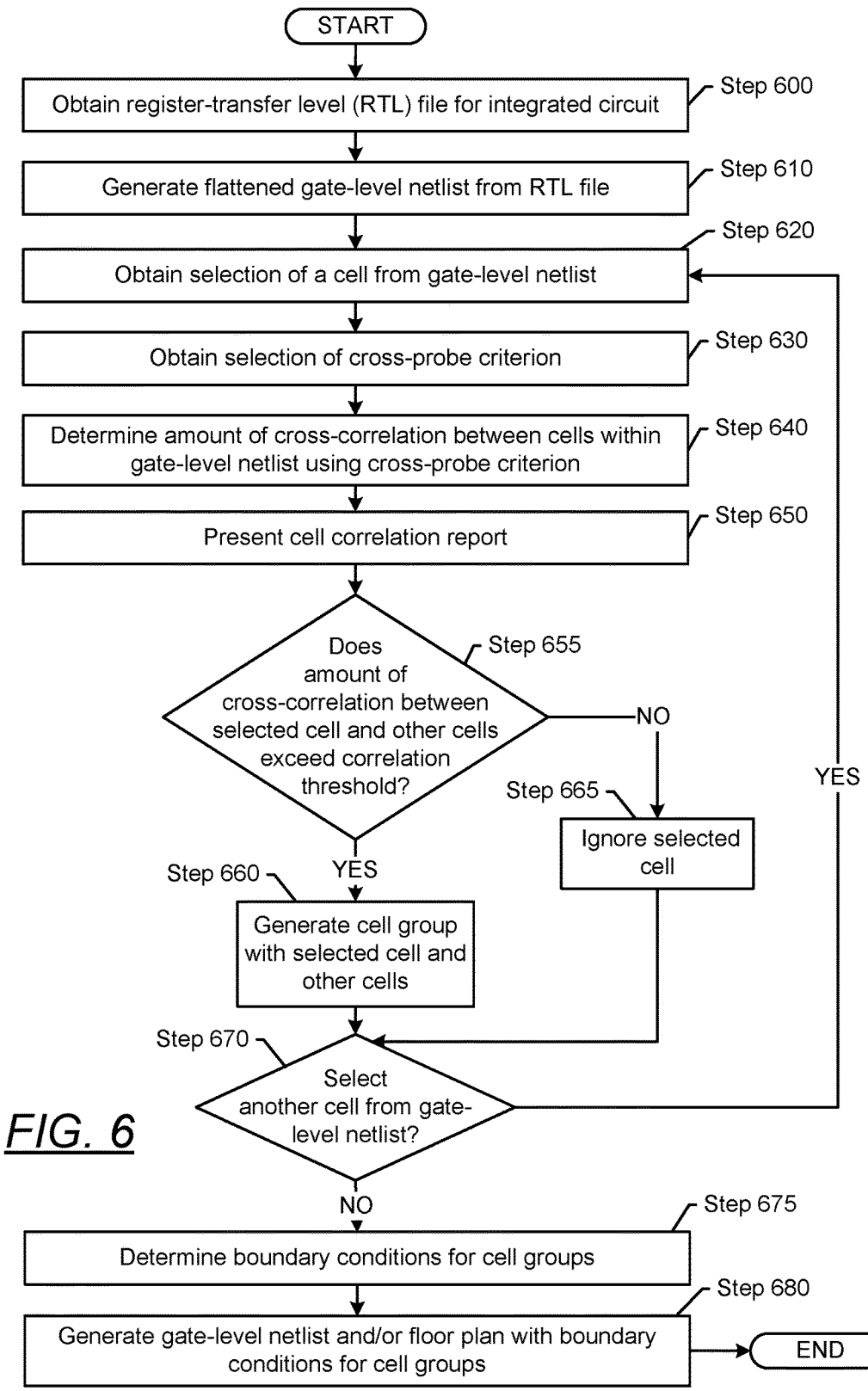

Turning to FIG. 6, FIG. 6 shows a flowchart in accordance with one or more embodiments. The process shown in FIG. 6 may involve, for example, one or more components discussed above in reference to FIG. 1 (e.g., computing system (105)). While the various steps in FIG. 6 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 600, an RTL file is obtained for an integrated circuit in accordance with one or more embodiments.

In Step 610, a flattened gate-level netlist is generated from an RTL file in accordance with one or more embodiments. Specifically, a gate-level netlist may be generated from the RTL file in Step 600 with one or more logical hierarchies defined within the HDL code of the RTL file. These logical hierarchies may correspond to circuit modules and/or sub-modules within the HDL code of the RTL file, and/or cell groups defined previously for the gate-level netlist. Accordingly, these logical hierarchies may be removed between cells in a flattened gate-level netlist.

In Step 620, a selection of a cell (also called "the selected cell") is obtained from a gate-level netlist in accordance with one or more embodiments. In particular, a user may select one or more cells for performing a comparison using a cross-probe criterion in Step 630 below. This selection may be performed using a graphical user interface, for example. On the other hand, a computing system may automatically select one or more cells for the correlation analysis. For example, each cell in a gate-level netlist may be selected iteratively until each cell is analyzed in Step 630 below.

In Step 630, a selection of a cross-probe criterion is obtained in accordance with one or more embodiments. Specifically, a user may select one or more types of cross-probe criterion to analyze the selected cell in Step 620 with other cells in a gate-level netlist. For example, if a user desires to obtain a gate-level netlist or a physical implementation with various timing synthesis characteristics, the user may select one or more cross-probe criteria that analyzes the timing synthesis characteristics of cells in a gate-level netlist when implemented in a clock tree synthesis.

In Step 640, an amount of cross-correlation is determined, using a cross-probe criterion, between cells within gate-level netlist in accordance with one or more embodiments. Using the cross-probe criterion from Step 630, a computing system may compare logical and/or physical synthesis characteristics of cells within the gate-level netlist. In other words, the computing system may calculate various circuit values corresponding to the logical and/or physical synthesis characters for each cell. Thus, various amounts of cross-correlation may be determined between the selected cell and other cells in a gate-level netlist.

In Step 650, a cell correlation report is presented in accordance with one or more embodiments. Specifically, the amounts of cross-correlations from Step 640 may be included in a cell correlation report that items the amount of cross-correlation for each cell in a gate-level netlist. The cell correlation report may be presented in a graphical user interface, as an email to a user, or in any other form. For an example of a cell correlation report, see FIG. 8 and the accompanying description below.

In Step 655, a determination is made whether an amount of cross-correlation between a selected cell and other cells exceeds a correlation threshold in accordance with one or more embodiments. For example, the correlation threshold may be an objective metric for determining which cells should be located in a particular cell group based on cross-correlating cells. In one or more embodiments, the correlation threshold specifies a correlation value for arranging cells in cell groups. If a cell exceeds the correlation value in a cell correlation report, for example, the cell may be placed in the corresponding cell group. In another embodiment, the correlation threshold provides a range of values to illustrate how closely connected the selected cell is with one or more other cells in the gate-level netlist.

In one or more embodiments, for example, a cell group generator may compare the cross-correlation amounts from Step 640 with a particular correlation threshold. The correlation threshold may be a user-selected value obtained with a graphical user interface, for example. If the cross-correlation between two cells is above the correlation threshold, the graphical user interface may prompt a user on whether to generate a new cell group with the two cells. If one of the cells is already located in an existing cell group, the prompt may ask the user whether to add the cell to the existing cell group.

When it is determined that the amount of cross-correlation exceeds the correlation threshold, the process may proceed to Step 660. When it is determined that the amount of cross-correlation fails to exceed the correlation threshold, the process may proceed to Step 665.

While a correlation threshold is used to analyze the amount of cross-correlation between cells, other correlation analyses may be performed in place of Step 655. For example, a user may make a subjective determination among cells in the cell correlation report from Step 650.

In Step 660, a cell group is generated with a selected cell and various other cells in accordance with one or more embodiments. Specifically, the selected cell from Step 620 and one or more cells from a gate-level netlist are assigned to a new cell group or to a preexisting cell group. Thus, in one or more embodiments, Step 660 generates a cell group hierarchy from a gate-level netlist previously flattened in Step 610. This cell group hierarchy may provide a pseudo-hierarchy that may allow for the generation of a cell group hierarchy in the midst of verifying and modifying a particular circuit design. In contrast, other logical hierarchies may be implemented in the RTL file from Step 600 before an analysis of logical and/or physical synthesis characteristics of the gate-level netlist and/or floorplan.

In one or more embodiments, the selected cell is assigned to various cell groups based on different cross-probe criterion. For example, the selected cell may be assigned to one cell group based on a desired timing criterion, while the selected cell may be assigned to another cell group based on a desired spacing criterion within a floorplan.

In one or more embodiments, for example, an attribute identifying members of a cell group in the RTL code of an RTL file, such as the RTL file from Step 600. In one or more embodiments, for example, the RTL file identifies a particular cell for a particular cell group within a gate-level netlist. This identification may be performed using a unique object name from the gate-level netlist or by an RTL line number in RTL code. Accordingly, a cell group generator may record the RTL line number corresponding to a cell when generating a cell group for the cell.

In one or more embodiments, various cell groups are defined by a separate file from the RTL file. For example, a cell group may be a regular text document that lists various cells in the gate-level netlist for a particular RTL file and an associated cell group with those cells.

In one or more embodiments, a user determines a unique cell group identifier. Rather than having generic cell identifiers (e.g., U237) for cells within a cell group, a user may assign names for a particular cell group for later identification and circuit design. Thus, a user may track which cells in a logical implementation and/or physical implementation are assigned to a particular function, for example.

In one or more embodiments, a cell group may be generated in a previous iteration of Steps 620-670. Thus, the selected cell may be added to a preexisting cell group that includes cells with amounts of cross-correlation above a correlation threshold or determined according to Step 655.

In Step 665, a selected cell is ignored in accordance with one or more embodiments. In particular, if the selected cell from Step 620 fails to exceed a correlation threshold, the selected cell may be ignored for purposes of generating a new cell group or assigning the selected cell to a pre-existing cell group. Thus, the selected cell may be assigned to no cell group or defined to correspond to no cell group. For example, if cell groups are defined using an embedded attribute in an RTL file, the attribute for the selected cell may include a value representing "no cell group." If cell groups are defined in a separate file from an RTL file, the selected cell may include no entry or include a value representing "no cell group" in the separate file.

In Step 670, a determination is made whether to select another cell from a gate-level netlist in accordance with one or more embodiments. When it is determined that another cell is to be selected for a cross-correlation analysis, the process may proceed to Step 620. When it is determined that the cross-correlation analysis is finished, the process may proceed to Step 675.

In one or more embodiments, for example, cells from a gate-level netlist are iteratively selected cells until each cell is cross-correlated with other cells from the gate-level netlist. Thus, once each cell has been selected for comparing an amount of cross-correlation in Step 655, the cell group generation process may automatically end.

On the other hand, a user may select various cells within a gate-level netlist for a cross-correlation analysis to determine if a respective cell should be assigned to a new cell group or a preexisting cell group. As such, the selection in Step 620 may correspond to multiple selected cells for the cross-correlation analysis. Once the cross-correlation analysis is complete for multiple selected cells, the process may proceed to Step 675.

In one or more embodiments, different types of cross-probe criteria are used for the same cells in Steps 620-670. Thus, Steps 620-670 may be repeated for the same selected cell for different types of cross-correlation in response to different types of cross-probe criteria. For example, if a selected cell is ignored in Step 655 for a specific timing criterion, the same selected cell may be assigned to a cell group based on an amount of cross-correlation for a specific spacing criterion.

In Step 675, various boundary conditions are determined for various cell groups in accordance with one or more embodiments. In one or more embodiments, a selection of a boundary condition is obtained from a user for a particular cell group. For example, a user may use a graphical user interface to select a particular cell group and assign a boundary condition to that cell group accordingly. If cells within the selected cell group are based on cells with similar timing requirements, the boundary condition may be a desired timing requirement for the selected cell group.

In another embodiment, a boundary condition may be assigned to a particular cell group automatically by an RTL-Synthesis compiler and/or an integrated circuit compiler. For example, when generating a new gate-level netlist using a logical synthesis, the RTL-Synthesis compiler may determine one or more boundary conditions for the cell group that maintains one or more logical synthesis characteristics of the particular cell group in the new gate-level netlist. In another example, when generating a physical implementation of the gate-level netlist, the integrated circuit compiler may determine one or more boundary conditions for the cell group that maintains one or more physical synthesis characteristics of the cell group in the physical implementation. In other words, the RTL-Synthesis compiler and/or the integrated circuit compiler may avoid performing one or more optimization methods on cells within a cell group that violate one or more logical and/or physical synthesis characteristics associated with the cell group.

In Step 680, a gate-level netlist and/or floorplan is generated with boundary conditions for various cell groups in accordance with one or more embodiments. Specifically, using one or more of the boundary conditions determined in Step 675, a gate-level netlist and/or physical implementation is generated using cells from the cell groups that maintain the boundary conditions. For example, if a respective boundary condition is a hard boundary condition, the RTL-Synthesis compiler generates a gate-level netlist with the cells from the cell group with the respective boundary condition. If the respective boundary condition is a soft boundary condition, the RTL-Synthesis compiler generates a gate-level netlist using one or more optimization algorithms that attempts to satisfy the soft boundary condition unless an overriding optimization criteria causes the RTL-Synthesis compiler to violate the soft boundary condition. On the other hand, if a floorplan is generated for the cell groups, then an integrated circuit compiler may apply hard and/or soft boundary conditions to the floorplan accordingly.

Figure 7:
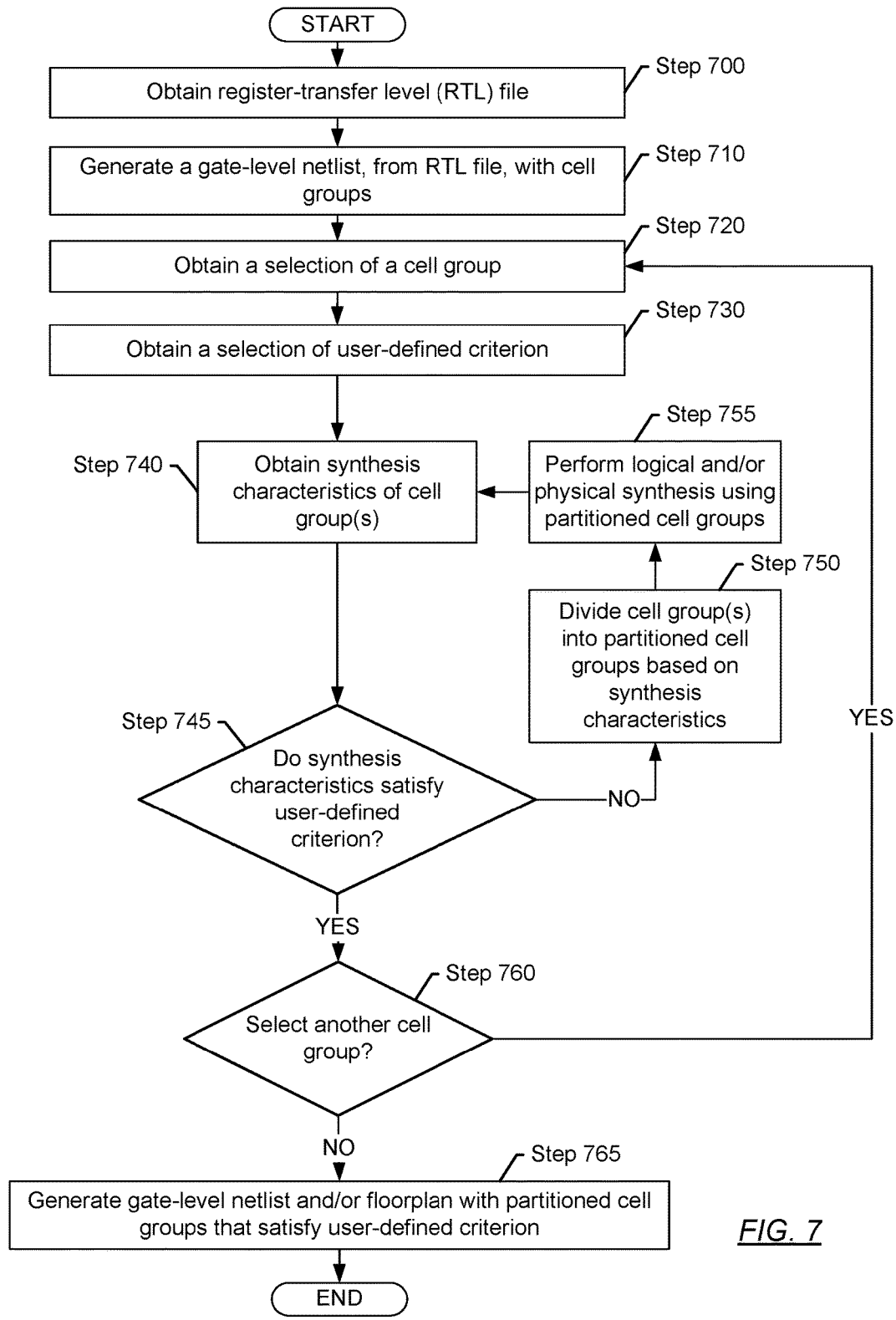

Turning to FIG. 7, FIG. 7 shows a flowchart in accordance with one or more embodiments. The process shown in FIG. 7 may involve, for example, one or more components discussed above in reference to FIG. 1 (e.g., computing system (105)). While the various steps in FIG. 7 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 700, an RTL file is obtained for an integrated circuit in accordance with one or more embodiments.

In Step 710, a gate-level netlist is generated, from an RTL file, with various cell groups in accordance with one or more embodiments. In one or more embodiments, for example, the cell groups may be obtained from the method described in FIG. 6 above. In another embodiment, the cell groups correspond to cells located in various modules defined by the RTL code in the RTL file in Step 710. In another embodiment, the cell groups correspond to blocks from a physical implementation, such as a floorplan. Thus, the gate-level netlist in Step 710 may be a new gate-level netlist generated by an RTL-Synthesis compiler using the RTL file from Step 700 or a gate-level netlist modified based on a physical implementation generated by an integrated circuit compiler.

In Step 720, a selection of a cell group (also called "the selected cell group") is obtained in accordance with one or more embodiments. For example, a user may select one or more cell groups using a graphical user interface. In particular, the graphical user interface may provides a graphical representation of the gate-level netlist from Step 710 or another type of logical synthesis that illustrates various cell groups among cells. On the other hand, the graphical user interface may provide a graphical representation illustrating various cell group divisions within a physical implementation, such as a graphical representation of a floorplan or clock tree synthesis.

In Step 730, a selection of a user-defined criterion is obtained in accordance with one or more embodiments. For example, in response to selecting one or more cell groups in Step 720, a user may select a user-defined criterion for analyzing selected cell groups or partitioned cell groups. The selection may be performed with a graphical user interface, for example. In particular, a cell group may be selected within a graphical representation of a logical implementation (e.g., a gate-level netlist representation) or a physical implementation (e.g., a floorplan representation). For example, a graphical user interface may trigger a drop-down menu that provides a list the predefined types of synthesis characteristics. In one or more embodiments, the user-defined criterion is assigned to a cell group in the HDL code of the RTL file from Step 710.

In Step 740, one or more synthesis characteristics are obtained regarding one or more cell groups in accordance with one or more embodiments. For example, cell groups from the gate-level netlist from Step 710 may be analyzed for one or more logical synthesis characteristics. On the other hand, a physical implementation may be generated with an integrated circuit compiler from the gate-level netlist from Step 710 and analyzed for physical synthesis characteristics accordingly. The cell groups may also be partitioned cell groups generated in Step 750 below. The synthesis characteristics may be presented in a graphical user interface similar to a cell correlation report.

In Step 745, a determination is made whether one or more synthesis characteristics satisfy a user-defined criterion in accordance with one or more embodiments. Using the synthesis characteristics from Step 740, for example, the values of the synthesis characteristics may be compared with the user-defined criterion from Step 730. Thus, a cell group analyzer may examine one or more cell groups for whether the synthesis characteristics pass the desired characteristics as specified by the user-defined criterion. In one or more embodiments, a cell group analyzer examines the selected cell group from Step 720 for whether the selected cell group satisfies the user-defined criterion. If the selected cell group satisfies the user-defined criterion, the process may proceed to Step 760 without partitioning the selected cell group. If the selected cell group fails to satisfy the user-defined criterion, the process may proceed to Step 750 for dividing the selected cell group into partitioned cell groups.

After the cell groups are partitioned in Step 750 below, each partitioned cell group may be analyzed accordingly in Step 740 with the user-defined criterion from Step 730 until one or more of the partitioned cell groups satisfy the user-defined criterion.

In Step 750, one or more cell groups are divided into partitioned cell groups based on one or more synthesis characteristics in accordance with one or more embodiments. Specifically, during a partitioning process, cells in a cell group may be divided into various subsets of cells to form the partitioned cell groups. Accordingly, the partitioned cell groups may occupy sub-blocks or pseudoblocks within an original block occupied by the selected cell group in Step 720.

In one or more embodiments, partitioned cell groups are operably coupled within a block using various pseudo pins. In other words, a desired synthesis characteristic may be imposed on a partitioned cell group inside a particular block using one or more pseudo pins. This pseudo pin connect may provide for repartitioning inside the block, while connections to other blocks in the floorplan may be maintained using constant output pins or input pins.

In one or more embodiments, the selected cell group from Step 720 or partitioned cell groups from Step 750 in a previous iteration of Steps 730-760 may be partitioned or repartitioned in a manner to satisfy the user-defined criterion. For example, a single partitioned cell group may be further divided into various partitioned cell groups. In one or more embodiments, cells from various partitioned cell groups are redistributed among one or more of the partitioned cell groups. In other words, a cell from one partitioned cell group may be moved to a different partitioned cell group.

Furthermore, the division of cells between partitioned cell groups may be performed randomly or pseudorandomly. In one or more embodiments, partitioned cell groups are produced by the cell group generator according to an optimization algorithm that increases the likelihood that one or more of the partitioned cell groups may have synthesis characteristics that satisfy the user-defined criterion. In one or more embodiments, the partitioned cell groups may be produced using various iterative search methods, such as Newton's method or a gradient-descent method. Thus, a cell group may be iteratively repartitioned until the respective cell group satisfies the user-defined criterion or has synthesis characteristics that converge to a limit that may be approximate the user-defined criterion.

In Step 755, a logical and/or physical synthesis is performed using one or more repartitioned cell groups in accordance with one or more embodiments. Specifically, a logical and/or physical synthesis may be performed using various boundary conditions regarding the repartitioned cell groups from Step 760. Thus, a cell group generator may explore one or more design of an integrated circuit to determine circuit parameters that may achieve the user-defined criterion.

In Step 760, a determination is made whether to select another cell group in accordance with one or more embodiments. When it is determined that another cell group is to be selected for a user-defined criterion analysis, the process may proceed to Step 730. When it is determined that another cell group is not to be selected, the process may proceed to Step 765.

In Step 765, a physical implementation is generated that satisfies user-defined criterion for partitioned cell groups according to a user-defined criterion in accordance with one or more embodiments. For example, a floorplan may be determined where the partitioned cell groups from Step 750 correspond to physical synthesis characteristics within a floorplan that matches the desired characteristics of the user-defined criterion.

FIG. 8 provides an example of generating a cell group. The following example is for explanatory purposes only and not intended to limit the scope of the technology. Turning to FIG. 8, a cell correlation report (810) describes various amounts of cross-correlation between various cells (e.g., cell ABC (811), cell DEF (812), cell GHI (813), cell JKL (814), cell MNO (815)) located in a physical implementation with a clock tree synthesis. As shown, the cells (811, 812, 813, 814, 815) are compared based on clock skew (820) as the type of cross-probe criterion. Using a correlation function (830), such as one performed by a cell cross-correlator, the amounts of cross-correlation between different cells is determined in the cell correlation report (810). Accordingly, the correlation function (830) determines that cell ABC (811) and cell DEF (812) correlate above a correlation threshold (840) with a value of 0.5. In other words, cells that correlate with a value greater than 0.5 are designated for grouping into a new cell group (850). Thus, a new cell group (850) is generated from cell ABC (811) and cell DEF (812).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for designing a circuit, comprising:
obtaining, using a computer processor, a register-transfer level (RTL) file for an integrated circuit;
generating, using the computer processor and an RTL-Synthesis compiler and from the RTL file, a gate-level netlist comprising a plurality of cells for the integrated circuit;
determining, using the computer processor, an amount of clock skew between a first clock signal for a first cell and a second clock signal for a second cell in the gate-level netlist;
generating, using the computer processor and in response to the amount of clock skew exceeding a correlation threshold, a cell group comprising the first cell and the second cell, wherein the correlation threshold corresponds to a predetermined value of clock skew that specifies when one or more cells are automatically added to the cell group;
determining a boundary condition for the cell group, the boundary condition comprising a physical placement in a floorplan for the integrated circuit that produces a predetermined amount of clock skew in a clock tree synthesis for respective cells in the cell group; and
generating, using the computer processor, the floorplan for the integrated circuit, wherein the first cell and the second cell are placed in the floorplan according to the boundary condition.

2. The method of claim 1, further comprising:
flattening the gate-level netlist to remove one or more logical hierarchies between the plurality of cells;
determining, using the amount of clock skew, an amount of cross-correlation between the plurality of cells in the gate-level netlist; and
generating, using the amount of cross-correlation between the plurality of cells, a cell group hierarchy within the gate-level netlist.

3. The method of claim 1,
wherein the boundary condition further comprises a density bound having a predetermined cell density, and
wherein the first cell and the second cell are placed according to the predetermined cell density in a block within the floorplan.

4. The method of claim 1, further comprising:
presenting, within a cell correlation report and to a user, an amount of cross-correlation between the first cell and the second cell; and
obtaining, from a user, a cell selection for the cell group in response to presenting the amount of cross-correlation,
wherein generating the cell group comprises assigning the cell selection to the cell group.

5. The method of claim 1, further comprising:
generating, using an integrated circuit compiler (ICC) and from the gate-level netlist, the clock tree synthesis for the respective cells in the cell group.

6. The method of claim 1,
wherein generating the cell group comprises recording, in the gate-level netlist, an RTL line number from the RTL file associated with the first cell.

7. A system for designing a circuit, comprising:
a processor;
a register-transfer level (RTL) file for an integrated circuit;
a memory comprising instructions that, when executed by the processor, cause the processor to:
obtain the RTL file;
generate, using an RTL-Synthesis compiler and from the RTL file, a gate-level netlist comprising a plurality of cells for the integrated circuit;
determine an amount of clock skew between a first clock signal for a first cell and a second clock signal for a second cell in the gate-level netlist;
generate, in response to the amount of clock skew exceeding a correlation threshold, a cell group comprising the first cell and the second cell, wherein the correlation threshold corresponds to a predetermined value of clock skew that specifies when one or more cells are automatically added to the cell group;

determine a boundary condition for the cell group, the boundary condition comprising a physical placement in a floorplan for the integrated circuit that produces a predetermined amount of clock skew in a clock tree synthesis for respective cells in the cell group; and generate the floorplan for the integrated circuit, wherein the first cell and the second cell are placed in the floorplan according to the boundary condition.

8. The system of claim 7, wherein the memory further comprises instructions that, when executed by the processor, cause the processor to:

flatten the gate-level netlist to remove one or more logical hierarchies between the plurality of cells;

determine, using the amount of clock skew, an amount of cross-correlation between the plurality of cells in the gate-level netlist; and generate, using the amount of cross-correlation between the plurality of cells, a cell group hierarchy within the gate-level netlist.

9. The system of claim 7, wherein the boundary condition further comprises a density bound having a predetermined cell density, and wherein the first cell and the second cell are placed according to the predetermined cell density in a block within the floorplan.

10. The system of claim 7, wherein the memory further comprises instructions that, when executed by the processor, cause the processor to:

presenting, within a cell correlation report and to a user, an amount of cross-correlation between the first cell and the second cell, and wherein generating the cell group comprises obtaining a cell selection for the cell group from the user in response to presenting the amount of cross-correlation.

11. The system of claim 7, wherein the memory further comprises instructions that, when executed by the processor, cause the processor to:

generate, using an integrated circuit compiler (ICC) and from the gate-level netlist, the clock tree synthesis for the respective cells in the cell group.

12. A non-transitory computer readable medium comprising instructions for designing a circuit that, when executed by a processor, cause the processor to:

obtain a register-transfer level (RTL) file for an integrated circuit;

generate, using an RTL-Synthesis compiler and from the RTL file, a gate-level netlist comprising a plurality of cells for the integrated circuit;

determine an amount of clock skew between a first clock signal for a first cell and a second clock signal for a second cell in the gate-level netlist;

generate, in response to the amount of clock skew exceeding a correlation threshold, a cell group comprising the first cell and the second cell, wherein the correlation threshold corresponds to a predetermined value of clock skew that specifies when one or more cells are automatically added to the cell group;

determine a boundary condition for the cell group, the boundary condition comprising a physical placement in a floorplan for the integrated circuit that produces a predetermined amount of clock skew in a clock tree synthesis for respective cells in the cell group; and generate the floorplan for the integrated circuit, wherein the first cell and the second cell are placed in the floorplan according to the boundary condition.

13. The non-transitory computer readable medium of claim 12, wherein the instructions, when executed by the processor, further cause the processor to:

flatten the gate-level netlist to remove one or more logical hierarchies between the plurality of cells;

determine, using the amount of clock skew, an amount of cross-correlation between the plurality of cells in the gate-level netlist; and generate, using the amount of cross-correlation between the plurality of cells, a cell group hierarchy within the gate-level netlist.

14. The non-transitory computer readable medium of claim 12, wherein the boundary condition further comprises a density bound having a predetermined cell density, and wherein the first cell and the second cell are placed, within the floorplan, according to the predetermined cell density in a block.

15. The non-transitory computer readable medium of claim 12, wherein the instructions, when executed by the processor, further cause the processor to:

present, within a cell correlation report and to a user, an amount of cross-correlation between the first cell and the second cell, and wherein generating the cell group comprises obtaining a cell selection for the cell group from the user in response to presenting the amount of cross-correlation.

16. The non-transitory computer readable medium of claim 12, wherein the instructions, when executed by the processor, further cause the processor to:

generate, using an integrated circuit compiler (ICC) and from the gate-level netlist, the clock tree synthesis for the respective cells in the cell group.

17. The non-transitory computer readable medium of claim 12, wherein generating the cell group comprises recording, in the gate-level netlist, an RTL line number from the RTL file associated with the first cell.

* * * * *

UNITED STATES PATENT AND TRADEMARK OFFICE
CERTIFICATE OF CORRECTION

PATENT NO. : 9,886,539 B2
APPLICATION NO. : 15/099317
DATED : February 6, 2018
INVENTOR(S) : Viswanath et al.

Page 1 of 1

It is certified that error appears in the above-identified patent and that said Letters Patent is hereby corrected as shown below:

In the Specification

In Column 2, Lines 49-59, delete "may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements." And insert the same on Column 2, Line 48, as a continuation of the same paragraph.

Signed and Sealed this
Fourteenth Day of August, 2018

Andrei Iancu
*Director of the United States Patent and Trademark Office*